(12) United States Patent
Cunningham

(10) Patent No.: US 8,326,097 B2
(45) Date of Patent: Dec. 4, 2012

(54) METHOD AND APPARATUS FOR PROVIDING A LINEAR PHASE MODE-MATCHED LAUNCH OF LIGHT INTO AN END OF A MULTIMODE OPTICAL FIBER

(75) Inventor: David G. Cunningham, Suffolk (GB)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 549 days.

(21) Appl. No.: 12/544,467

(22) Filed: Aug. 20, 2009

(65) Prior Publication Data

US 2011/0044580 A1 Feb. 24, 2011

(51) Int. Cl.
*G02B 6/26* (2006.01)
*G02B 6/42* (2006.01)
(52) U.S. Cl. .......................... 385/31; 385/28
(58) Field of Classification Search .................. 385/31, 385/33, 38
See application file for complete search history.

(56) References Cited

U.S. PATENT DOCUMENTS

| 4,281,893 | A | * | 8/1981 | Yamada et al. | ................. | 385/29 |
| 5,892,866 | A | * | 4/1999 | Bristow et al. | ................. | 385/28 |
| 6,185,346 | B1 | | 2/2001 | Asawa et al. | | |
| 6,487,338 | B2 | | 11/2002 | Asawa et al. | | |
| 7,171,084 | B2 | | 1/2007 | Izumi et al. | | |
| 7,194,156 | B2 | * | 3/2007 | Deliwala | ........................ | 385/29 |
| 2001/0033587 | A1 | | 10/2001 | Painter et al. | | |
| 2002/0176661 | A1 | | 11/2002 | Van Eck | | |
| 2003/0072525 | A1 | | 4/2003 | Sjodin et al. | | |
| 2005/0243409 | A1 | | 11/2005 | Harter et al. | | |

OTHER PUBLICATIONS

"Excitation of higher order modes in optical fibers with parabolic index profile," by Chen, Applied Optics, vol. 27, No. 11, pp. 2353-2356, Jun. 1988.*
"Generation of Hermite-Gaussian modes in fiber-coupled laser-diode end-pumped lasers," by Chen et al, IEEE Journal of Quantum Electornics, vol. 33, No. 6, pp. 1025-1031, Jun. 1997.*
"Compensation of mutlimode fiber dispersion using adaptive optics via convex optimization," by Panicker et al, Journal of Lightwave Technology, vol. 26, No. 10, pp. 1295-1303, May 2008.*
Eric G. Johnson, Member IEEE, Jared Stack & Charles Koehler; Light Coupling by a Vortex Lens into Graded Index Fiber; Journal of Lightwave Technology; May 2001; pp. 753-758; vol. 19, No. 5; IEEE.
Simon Ramo, John R. Whinnery, Theodore Van Duzer; Fields and Waves in Communication Electronics; Chapters 14:11 and 14:12; pp. 765-771.

(Continued)

*Primary Examiner* — Ryan Lepisto
*Assistant Examiner* — Robert Tavlykaev

(57) ABSTRACT

A method and an apparatus are provided for launching light into an entrance facet of a multimode optical fiber (MMF) of an optical link in a way that excites one or more higher-order Hermite Gaussian (HMG) mode groups in the MMF. Exciting higher-order HMG mode groups in the MMF increases the bandwidth of the link while also providing reduced modal noise. In addition, selectively exciting one or more higher-order HMG mode groups in the MMF ensures that the launch will provide desirable results even in cases where the connector that connects the end of the MMF to the optical transceiver or transmitter is offset with respect to the receptacle of the optical transceiver or transmitter. This feature allows for greater manufacturing tolerances when manufacturing the connectors and receptacles because precise alignment between them is not critical to achieving a successful launch.

16 Claims, 8 Drawing Sheets

OTHER PUBLICATIONS

F. Dubois, Ph. Emplit, and O. Hugon; Selective mode excitation in graded-index multimode fiber by a computer-generated optical mask; Apr. 1, 1994; pp. 433-435; vol. 19, No. 7; Optical Society of America; Belguim.

G. Machavariani, N. Davidson, A.A. Ishaaya, & A.A. Friesem; Intra-cavity phase element improves laser mode stability; Dept. of Physics of Complex Systems, Weizmann Institute of Science, Rehovot 76100, Israel.

* cited by examiner

METHOD AND APPARATUS FOR PROVIDING A LINEAR PHASE MODE-MATCHED LAUNCH OF LIGHT INTO AN END OF A MULTIMODE OPTICAL FIBER

TECHNICAL FIELD OF THE INVENTION

The invention relates to optical communications networks over which data in the form of optical signals is transmitted and received over optical waveguides. More particularly, the invention relates to methods and apparatuses for providing a linear phase mode matched launch of light from a light source into an end of an optical multimode fiber (MMF) to excite one or more Hermite Gaussian Mode (HGM) groups.

BACKGROUND OF THE INVENTION

In optical communications networks, optical transceivers are used to transmit and receive optical signals over optical fibers. An optical transceiver generates amplitude and/or phase and/or polarization modulated optical signals that represent data, which are then transmitted over an optical fiber coupled to the transceiver. Each optical transceiver includes a transmitter side and a receiver side. On the transmitter side of the optical transceiver, a laser light source generates the optical data signals based on a received electrical data signal and an optical coupling system optically couples, or images, the light onto an end facet of an optical fiber. The laser light source typically is made up of one or more laser diodes that generate light of a particular wavelength or wavelength range. The optical coupling system typically includes one or more reflective, refractive and/or diffractive elements. On the receiver side of the optical transceiver, a photodiode detects an optical data signal transmitted over an optical fiber and converts the optical data signal into an electrical data signal, which is then amplified and processed by electrical circuitry of the receiver side to recover the data. The combination of the optical transceivers connected on each end of the optical fiber and the optical fiber itself is commonly referred to as an optical fiber link.

In high-speed optical fiber links (e.g., 10 Gigabits per second (Gb/s) and higher), multimode optical fibers (MMFs) are often used to carry the optical data signals. In such links, certain link performance characteristics, such as the link transmission distance, for example, are dependent in part on the design of the optical coupling system, the modal bandwidth of the fiber, and the relative intensity noise (RIN) of the laser diode. The modal bandwidth of the fiber and the RIN of the laser diode can be affected by the launch conditions of the laser light into the end of the MMF. The launch conditions are, in turn, dependent upon the properties of the laser diode itself and upon the design and configuration of the optical coupling system. Due to limitations on the manufacturability of optical elements that are typically used in optical coupling systems, the ability to control the launch conditions is limited primarily to designing and configuring the optical coupling system to control the manner in which it optically couples the light from the laser diode onto the entrance facet of the MMF.

It is sometimes required to create a high data rate MMF link using older, previously-installed MMFs. MMFs of the type that are typically used for this purpose (i.e., OM1 or OM2 types) typically have low modal bandwidths. However, launch techniques such as Center Launch (CL) techniques, Offset Launch (OSL) techniques, or a combination the two, called dual launch (DL) techniques, are known to significantly increase the modal bandwidth of MMF links. For this reason, these launch techniques have been standardized for 10 Gigabit Ethernet links. However, at higher data rates, such as, for example, 40 Gb/s, these launch techniques do not create a sufficient increase in the modal bandwidth of an MMF optical link. Hence, a need exists for a new launch technique that provides MMF optical links with even higher modal bandwidths.

One method that is sometimes used to provide an MMF optical link with an increased modal bandwidth is to excite only a small number of fiber mode groups in the MMF. For example, various attempts have been made to excite the lowest-order mode group in MMFs in order to increase the modal bandwidth of the link. However, such attempts generally use CL techniques, which are known to provide insufficient increases in modal bandwidth. It has also been proposed to use mode filters in the receivers of the links to increase the modal bandwidth of the links, but mode filters often introduce excessive modal noise into the links.

In order to overcome some of these issues, launch techniques have been proposed that selectively excite one or more higher-order mode groups in an MMF of an optical link in order to increase the bandwidth of the MMF optical link. For example, it is well known that spiral launch techniques can be used to target higher-order mode groups in an MMF, and the use of such techniques have been proposed as part of the 10 GBASE-LRM standards process. Indeed, the use of spiral launch techniques remains a valid approach to increasing the bandwidth of an MMF optical link. Spiral launch techniques target the Laguerre Gaussian (LG) mode groups in the MMF and use a radial phase mask that is matched to a particular LG mode group of the MMF. However, there is reason to believe that spiral launch techniques may not provide significant tolerance to connector offsets. In other words, if the connector that connects the MMF to the receptacle of the optical transceiver is offset in any radial direction relative to the receptacle such that a degree of optical misalignment is introduced into the launch, a radial phase mismatch may exist between the phase of the LG mode group of the MMF that is being targeted and the phase of the light that is being launched into the entrance facet of the MMF. Due to this radial phase mismatch, the target LG mode group may not be sufficiently excited and/or other non-targeted LG mode groups of the MMF may be excited. The consequence of these unintended results may be a failure to sufficiently increase the modal bandwidth of the MMF optical link.

Accordingly, a need exists for a launch technique that is capable of exciting one or more higher-order mode groups of an MMF in order to increase the bandwidth of the MMF optical link. A need also exists for such a launch technique that provides the desired effect of increasing link bandwidth without increasing modal noise in the MMF optical link. A further need exists for such a launch technique that achieves these goals and, at the same time, that provides tolerance to connector offsets.

SUMMARY OF THE INVENTION

The invention is directed to a Hermite Gaussian (HMG) optical launch apparatus and method for optically launching laser light into a multimode optical fiber (MMF) to excite at least one targeted higher-order HMG mode group of the MMF. The HMG optical launch apparatus comprises a laser, at least one optical element, and a linear phase mask. The laser produces laser light, which is received by the at least one optical element. The at least one optical element is positioned to receive laser light produced by the laser and is configured to focus the received laser light to at least one waist. The linear phase mask is positioned at a location where the laser light produced by the laser is focused to a waist by the at least one optical element and directed onto the linear phase mask. The linear phase mask is configured with a phase pattern that causes the phase of the laser light directed onto the linear phase mask to be altered to match or substantially match the phase of the targeted HMG mode group of the MMF. The laser, the at least one optical element, and the linear phase mask are positioned relative to each other and relative to an entrance facet of the MMF such that the phase-altered laser light has a waist at the entrance facet of the MMF that matches or substantially matches a waist of the targeted higher-order HMG mode group of the MMF. The phase-altered laser light that is incident on the entrance facet of the MMF causes the targeted higher-order HMG mode group to be excited, which causes the modal bandwidth of the MMF to be increased.

The method comprises the following: with a laser, producing laser light; with at least one optical element, receiving laser light produced by the laser and focusing the received laser light to at least one waist; passing laser light produced by the laser through a linear phase mask positioned at a location where the laser light is focused to a waist by the at least one optical element to cause a phase of the laser light to be altered to match or substantially match a phase of the targeted HMG mode group of the MMF; and directing the phase-altered laser light onto the entrance facet of the MMF to cause the targeted higher-order HMG mode group of the MMF to be excited. The laser, the at least one optical element, and the linear phase mask are positioned relative to each other and relative to the entrance facet of the MMF such that the phase-altered laser light has a waist at the entrance facet of the MMF that matches or substantially matches a waist of the targeted higher-order HMG mode group of the MMF. The excitation of the targeted higher-order HMG mode group causes a modal bandwidth of the MMF to be increased.

These and other features and advantages of the invention will become apparent from the following description, drawings and claims.

DETAILED DESCRIPTION OF AN ILLUSTRATIVE EMBODIMENT

Figure 1:
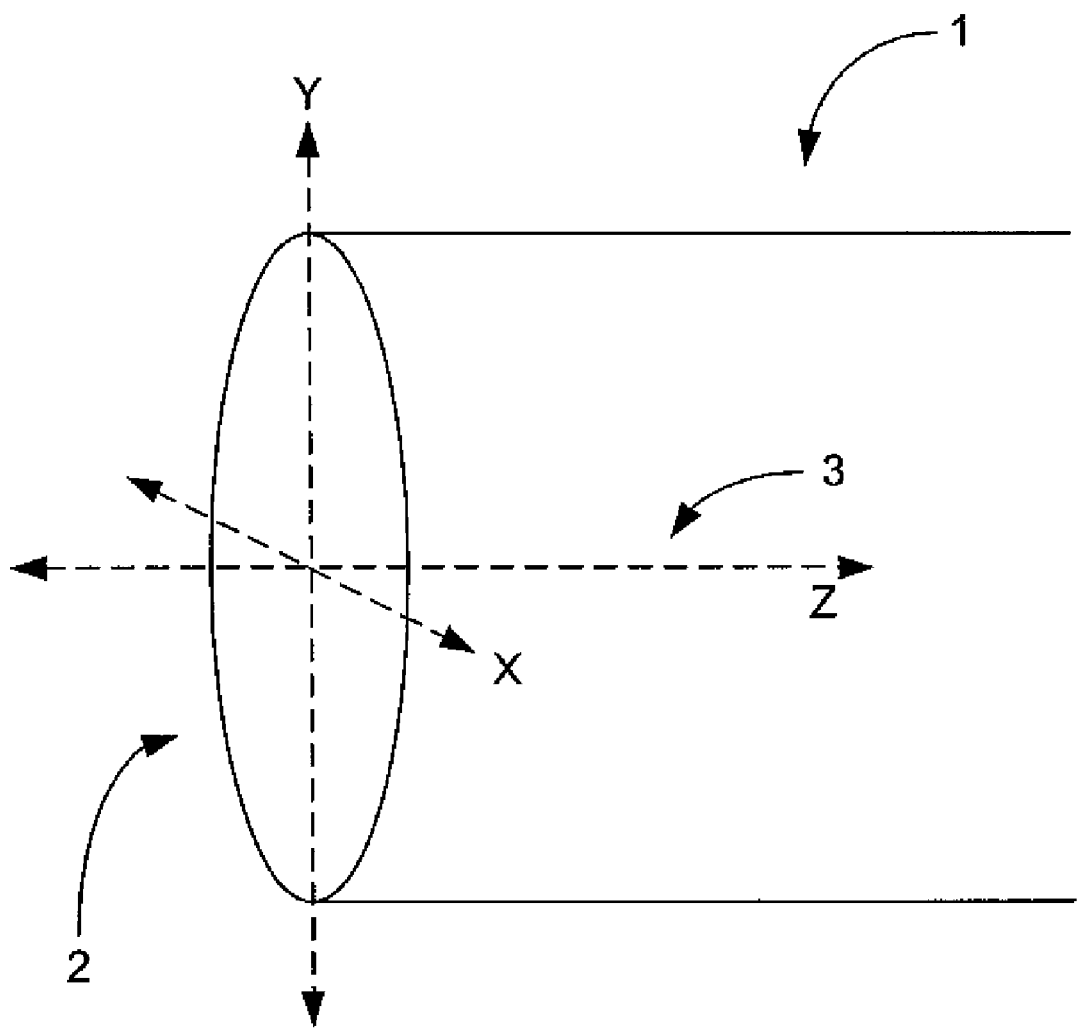
FIG. 1 illustrates a perspective view of a portion of an MMF having an entrance facet that is defined in terms of the x and y coordinates of a Cartesian Coordinate System and an optical axis defined in terms of the z coordinate of the Cartesian Coordinate System.

The invention is directed to a method and an apparatus for launching light into an entrance facet of a MMF of an MMF optical link in a way that excites one or more targeted higher-order Hermite Gaussian (HMG) mode groups in the MMF. Exciting higher-order HMG mode groups in the MMF increases the bandwidth of the link while also providing reduced modal noise. In addition, using a launch method that selectively excites one or more higher-order HMG mode groups in the MMF ensures that the launch will be successful even in cases where the connector that connects the end of the MMF to the optical transceiver or transmitter is offset with respect to the receptacle of the optical transceiver or transmitter. In other words, the use of the launch method of the invention to selectively excite one or more higher-order HMG mode groups in the MMF ensures that a sufficient increase in link bandwidth will be achieved even if there is some amount of optical misalignment due to the connector being offset relative to the corresponding receptacle. This feature allows for greater manufacturing tolerances when manufacturing the connectors and receptacles because precise alignment between them is not critical to achieving good launch results.

HMG mode groups are relatively insensitive to launch offsets that are orthogonal to their axes, which are generally coaxial with the optical axis of the MMF in which the HMG mode groups propagate. For this reason, it has been determined in accordance with the invention that a launch technique that selectively excites one or more higher-order HMG mode groups of an MMF may be used to increase the bandwidth of an MMF optical link without increasing modal noise, while, at the same time, providing tolerance to connector offsets. Although known methods have been proposed for exciting higher-order HMG mode groups in an MMF, none of the proposed methods explore the possibility that exciting higher-order HMG mode groups can increase the bandwidth of an MMF optical link while also providing tolerance to connector offsets. A number of known launch techniques have been proposed for exciting higher-order HMG mode groups, including, for example, laterally offsetting the laser beam being launched into the entrance facet of an MMF, angularly offsetting the laser beam being launched into the entrance facet of an MMF, and using masks that match the amplitude and phase of the launched laser beam with the amplitude and phase of a targeted HMG mode group of the MMF.

However, with all of the known launch techniques for exciting higher-order HMG mode groups, alignment is critical in that unintended misalignment between the launched light beam and the entrance facet of the MMF can produce undesired results. Consequently, the known proposed launch techniques for exciting higher-order HMG mode groups in an MMF generally do not provide for greater connector offset tolerance. In addition, the task of manufacturing masks that match both amplitude and phase can be relatively difficult. Because the launch method and apparatus of the invention do not require perfect alignment in directions that are orthogonal to the axes of the HMG mode groups, the launch method and apparatus provide greater connector offset tolerance, which simplifies the tasks associated with manufacturing the mask that is used in the apparatus of the invention.

In accordance with the invention, a linear phase mask is used to match the phase of a launched laser beam with the phase of a targeted higher-order HGM mode group of the MMF at an entrance facet of the MMF. The optical coupling system of the optical transceiver or transmitter is configured to ensure that, at the entrance facet of the MMF, the waist of the fundamental mode of the laser beam being launched into the MMF is matched to the waist of the targeted HMG mode group. The combination of (1) matching the waist of fundamental mode of the laser beam to the waist of the targeted HMG mode group of the MMF at the entrance facet of the MMF, and (2) matching the phase of the laser beam to the phase of the targeted HMG mode of the MMF at entrance facet of the MMF causes the targeted higher-order HMG mode group to be excited in the MMF. In turn, excitation of the targeted higher-order HMG mode group of the MMF increases the bandwidth of the optical link without increasing modal noise in the MMF link. Furthermore, as will be described below in more detail, the launch technique of the invention provides tolerance to connector offsets in that the aforementioned goals are achieved even in cases where there may be some connector offset or misalignment in directions that are generally orthogonal to the optical axis of the MMF.

FIG. 1 illustrates a perspective view of a portion of an MMF 1 having an entrance facet 2 and an optical axis 3. The optical axis 3 of the MMF 1 corresponds to the z-axis of a Cartesian Coordinate System. Unlike LG mode groups, which are radially symmetric about the optical axis 3 of the MMF 1, HMG mode groups tend to be radially asymmetric about the optical axis 3 of the MMF 1. In other words, HMG mode groups exhibit behavioral differences in the horizontal (i.e., x) and vertical (i.e., y) dimensions, which are orthogonal to the optical axis 3 of the MMF 1. The phase of an HMG mode group corresponds to the x-dimension whereas the amplitude of an HMG mode group corresponds to the y-dimension. The x- and y-dimensions correspond to the x-axis and the y-axis, respectively, of the Cartesian Coordinate System, which are co-planar with each other and orthogonal to the z-axis of the Cartesian Coordinate System. Because spiral launch techniques target LG mode groups, a spiral launch phase mask must be radially matched to the phase of the targeted LG mode group. Consequently, when using spiral launch techniques, connector offsets in the horizontal and/or vertical dimensions (i.e., the radial dimension) relative to the optical axis 3 of the MMF 1 can result in radial phase mismatches, which, as indicated above, can lead to unsuccessful or undesirable launch results.

In contrast, because the linear phase mask of the invention only needs to be aligned in the horizontal dimension (i.e., along the x-axis), the mask can be phase aligned with the target HMG mode group of the MMF 1 even if there is some amount of connector offset in the vertical dimension (i.e., along the y-axis). Consequently, the HMG launch technique of the invention provides more tolerance to connector offset, which, in turn, allows desirable launch results to be achieved even if there is some amount of connector offset. This tolerance to connector offset also allows manufacturing tolerances to be relaxed for the optical connectors and receptacles.

Figure 2:
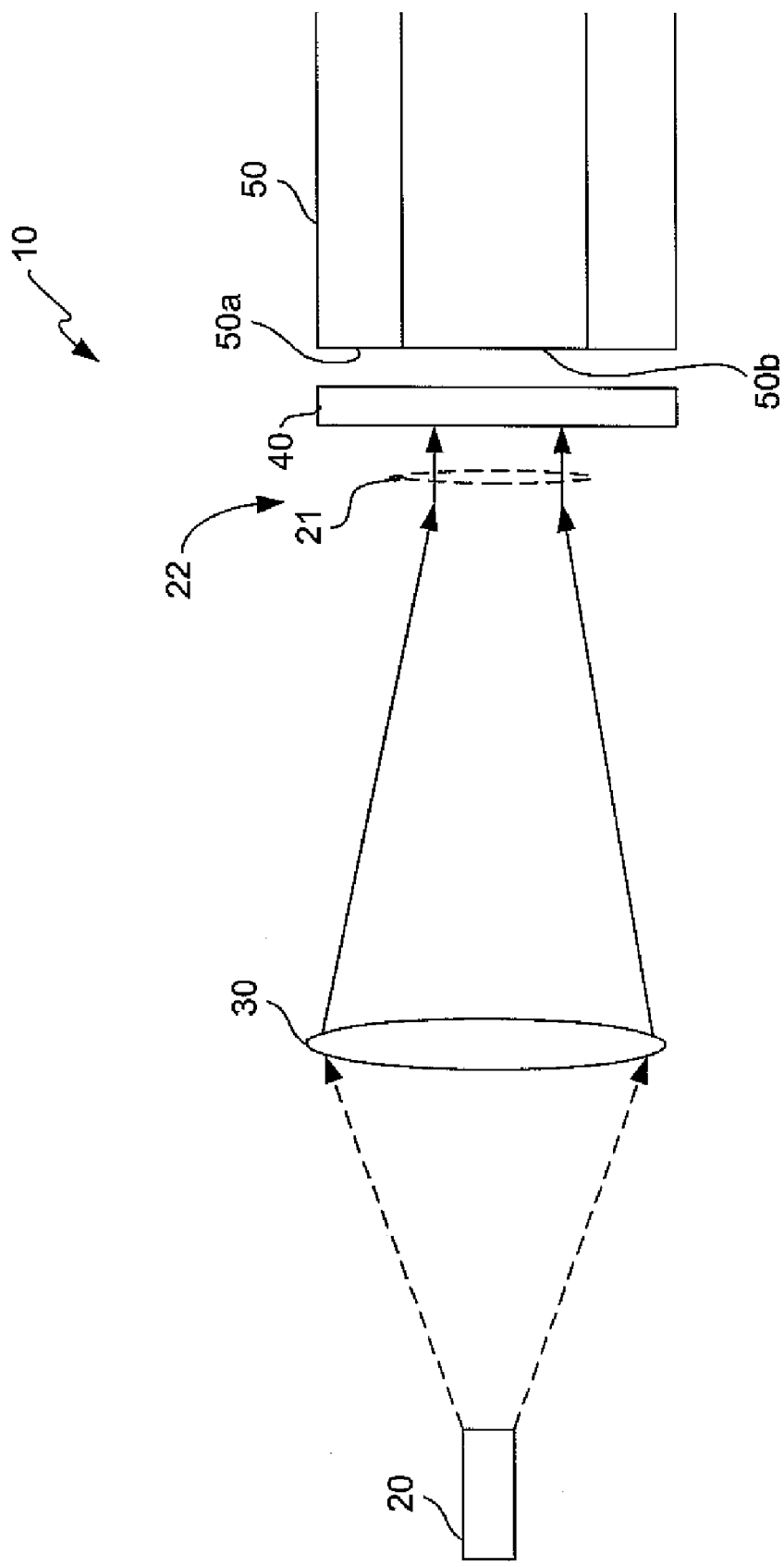
FIG. 2 illustrates a block diagram of an HMG optical launch apparatus in accordance with an illustrative embodiment for optically coupling laser light onto an entrance facet of an MMF.

FIG. 2 illustrates a block diagram of an HMG optical launch apparatus 10 in accordance with an illustrative embodiment. The HMG optical launch apparatus 10 includes a laser 20, an optical element 30, and a linear phase mask 40. In accordance with this embodiment, the linear phase mask 40 is positioned in close proximity to, or in contact with, an entrance facet 50a of an MMF 50. The optical element 30 may be, for example, one or more refractive elements (e.g., one or more focusing lenses), one or more diffractive elements (e.g., one or more diffraction gratings), one or more reflective elements (e.g., one or more mirrors), one or more optical waveguides, or a combination of one or more of any of these optical elements. In addition, the optical element 30 may simply be some gaseous medium, such as air, for example, that provides an interface between the laser 20 and the linear phase mask 40.

In accordance with the illustrative embodiment of FIG. 2, the optical element 30 is a focusing lens that receives an expanded laser light beam produced by the laser 20 and focuses the fundamental mode of the expanded laser light beam to a waist 21 at a location proximate the entrance facet 50a of the MMF 50. The meaning of the term "waist", as that term is used herein, is the same as the customary meaning of this term in the art of optics, which is the minimum spot size of the laser light beam along its optical axis. The waist of any given HMG mode group is mathematically defined by a well-known mathematical equation. Therefore, the waist of any given HMG mode group of the MMF 50 can be determined mathematically. In the region of space 22 where the waist 21 occurs, the linear phase mask 40 is positioned between the optical element 30 and the entrance facet 50a of the MMF 50. The configuration and spatial position of the optical element 30 is such that the waist 21 matches or substantially matches the waist (not shown) of a targeted HMG mode group of the MMF 50 at the entrance facet 50a of the MMF 50. Consequently, the configuration and spatial position of the optical element 30 is selected so that the waist 21 of the fundamental mode of the laser 20 is incident on a core 50b of the MMF at the entrance facet 50a of the MMF 50 and is matched or substantially matched to the waist of the targeted higher-order HMG mode group. The term "targeted", as that term is used herein, is intended to mean a particular higher-order HMG mode group of the MMF 1 that has been selected for excitation.

The linear phase mask 40 is a binary phase mask that is easily designed using standard software. As will be described in more detail below, the linear phase mask 40 is designed such that at the location proximate the entrance facet 50a, the phase of the laser light as altered by the linear phase mask 40 matches, or at least substantially matches, the phase of the targeted higher-order HMG mode group of the MMF 50. The term "linear phase mask", as that term is used herein, is intended to denote that the phase mask has a phase pattern that varies only along one axis, namely, the x-axis shown (FIG. 1). The term "binary", as that term is used herein to describe the linear phase mask 40, is intended to denote that the phase pattern of the phase mask varies between only two phase values, as will be described below in detail with reference to FIGS. 3, 4, 5A and 6.

With reference again to FIG. 2, it should be noted that the optical element 30 may be eliminated if the laser 20 produces laser light that has a fundamental mode that converges to its waist 21 in the region 22 proximate the entrance facet 50a of the MMF 50, with the waist 21 substantially matching the waist of the targeted HMG mode group of the MMF 50. In the latter case, the positioning of the linear phase mask 40 does not change, i.e., it is still positioned in the region 22 proximate the entrance facet 50*a* and has a phase that is matched or substantially matched to the phase of the targeted higher-order HMG mode group of the MMF 50.

Figure 3:
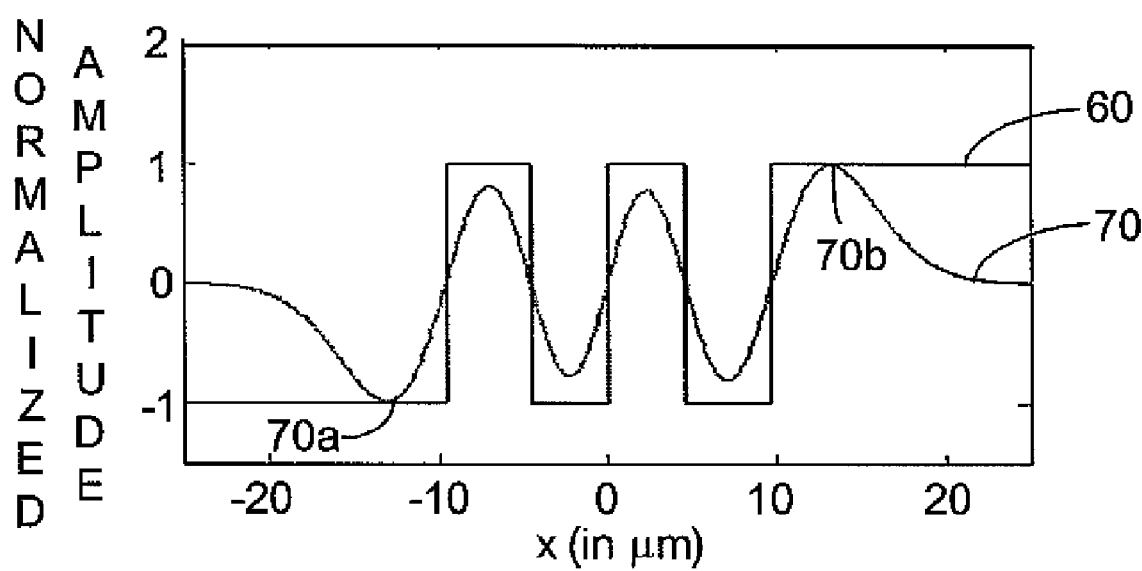
FIG. 3 illustrates a graph that demonstrates the relationship between the linear phase mask shown in FIG. 2 and a targeted higher-order HMG mode group of the MMF shown in FIG. 2 when the linear phase mask is aligned with the targeted higher-order HMG mode group.

FIG. 3 illustrates a graph that demonstrates the relationship between the linear phase mask 40 shown in FIG. 2 and a targeted higher-order HMG mode group of the MMF 50 shown in FIG. 2 when the linear phase mask 40 is aligned with the targeted higher-order HMG mode group. The curve 60 represents the phase pattern of the linear phase mask 40 and the curve 70 represents the targeted higher-order HMG mode group. The vertical axis of the graph corresponds to the normalized amplitude of the targeted higher-order HMG mode group and the horizontal axis of the graph corresponds to the x-dimension of the MMF 50 in micrometers (μm). The waist of the targeted HMG mode group represented by curve 70 is approximately equal to the distance between the peaks 70*a* and 70*b* of the curve 70. The linear phase mask curve 60 is a step function having normalized maximum and minimum amplitudes of +1 and −1, respectively. Thus, in this example, the normalized binary phase values are +1 and −1. The HMG mode group curve 70 is an HMG function having a normalized amplitude that ranges from a maximum value of about +1 to a minimum value of about −1. It can be seen that when the curve 60 is in phase with the curve 70, as is the case in FIG. 3, the maximum amplitudes of the curves 60 and 70 coincide with each other and the minimum amplitudes of the curves 60 and 70 coincide with each other. The manner in which the linear phase mask 40 represented by the curve 60 is used to excite the targeted HMG mode group represented by curve 70 will now be described with reference to FIG. 4.

Figure 4:
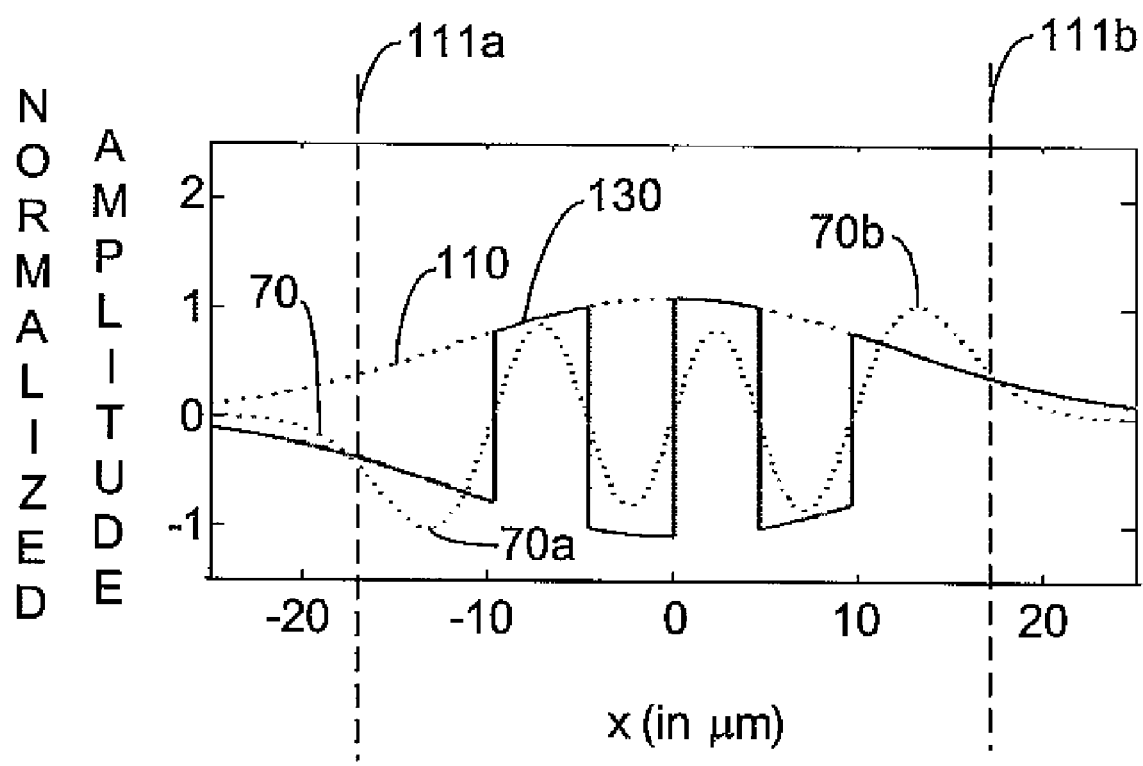
FIG. 4 is a graph that illustrates the manner in which the HMG optical launch apparatus shown in FIG. 2 is used to excite the targeted HMG mode group represented by one of the curves shown in FIG. 3.

FIG. 4 is a graph that illustrates the manner in which the HMG optical launch apparatus 10 shown in FIG. 2 is used to excite the targeted HMG mode group represented by the curve 70 shown in FIG. 3. The graph of FIG. 4 will be described with reference to FIGS. 2, 3 and 4. The graph of FIG. 4 shows: (1) a curve 110 that represents the normalized amplitude of the fundamental mode of the laser 20 in the region 22 where the beam is focused to its waist 21 and impinges on the linear phase mask 40; (2) the curve 70 shown in FIG. 3 representing the targeted higher-order HMG mode group of the MMF 50; and (3) a curve 130 that represents the excited targeted higher-order mode of the MMF 50 at the entrance facet 50*a* of the MMF 50. For ease of illustration, the curve 60 shown in FIG. 3 is not shown in FIG. 4. However, in the example depicted by the graph of FIG. 4, it is assumed that the linear phase mask 40 is aligned with the targeted HMG mode group in the manner demonstrated by the graph of FIG. 3.

The waist of the targeted HMG mode group represented by curve 70, which, as stated above, is approximately equal to the distance between the peaks 70*a* and 70*b* of the curve 70, is represented in FIG. 4 as the distance between the dashed lines 111*a* and 111*b*. The waist of the fundamental mode of the laser 20 is equal to the distance between the dashed lines 111*a* and 111*b*. Thus, the waist of the fundamental mode of the laser 20 is equal to the waist of the targeted HMG mode group at the entrance facet 50*a* of the MMF 50. The shape of the curve 130 (representing the excited targeted higher-order HMG mode group) results from the matching of the waist of the fundamental mode of the laser 20 with the waist of the targeted HMG mode group of the MMF 50 at the entrance facet 50*a* of the MMF 50 in combination with the matching of the phase of the fundamental mode of the laser 20 with the phase of the targeted HMG mode group of the MMF 50 at the entrance facet 50*a* of the MMF 50.

Some lasers emit beams that are generally circular in shape and some lasers emit beams that are generally elliptical in shape. For example, Vertical Cavity Surface Emitting Lasers (VCSELs) emit beams that are generally circular in shape whereas distributed feedback (DFB) lasers typically emit beams that are generally elliptical in shape. To achieve the best launch results in accordance with the invention, the waist of the fundamental mode of the laser 20 should match the waist of the targeted HMG mode group of the MMF 50 in both the x- and y-dimensions at the entrance facet 50*a* of the MMF 50. In order for the waists of the fundamental mode of the laser 20 and of the targeted HMG mode group of the MMF 50 to match in both the x- and y-dimensions, the laser beam impinging on the linear phase mask 40 should be generally elliptical in shape. In order for the laser beam that is directed onto the linear phase mask 40 to be generally elliptical in shape, either the laser 20 should be one that emits an elliptical beam or, if the laser 20 emits a circular beam, the optical element 30 or some other device or medium between the laser 20 and the linear phase mask 40 should be configured to convert the generally circularly-shaped beam emitted by the laser 20 into a generally elliptically-shaped beam. Launch results obtained by the HMG optical launch apparatus 10 shown in FIG. 2 when a generally circularly-shaped beam is used and when a generally elliptically-shaped beam is used are described below with reference to FIGS. 5A and 6, respectively.

The linear phase mask of the invention is similar to a spiral phase mask in that each is designed to match the fundamental mode of the laser to a targeted mode group of the fiber. However, as stated above, a spiral phase mask is designed to radially match the phase of the fundamental mode of the laser to a targeted LG mode group about the optical axis of the fiber, where each radial position is defined by a radial coordinate, r, of a Polar Coordinate System and where the optical axis of the fiber corresponds to a z-axis of the Polar Coordinate System. In contrast, the linear phase mask of the invention is designed to match the phase of the targeted HMG mode group only in the x-dimension, but not in the y-dimension, where positions in the x- and y-dimensions are defined by x and y coordinates, respectively, of a Cartesian Coordinate System. However, because of the similarities between the linear phase mask of the invention and a spiral phase mask, if a circular beam as opposed to an elliptical beam is directed onto the linear phase mask, the waists of the fundamental mode of the laser and of the targeted HMG mode group of the MMF will match in the x-dimension, but will not match in the y-dimension. Consequently, as might be expected, if a circular beam is used, the linear phase mask of the invention will produce launch results that are similar to those that are produced by a spiral phase mask. The similarities are demonstrated by FIGS. 5A and 5B.

Figure 5A:
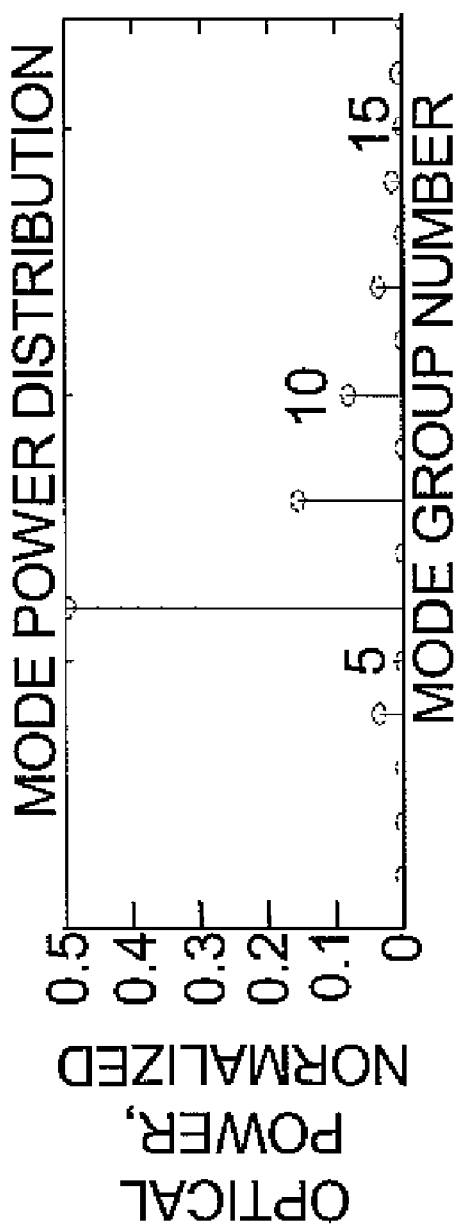
FIG. 5A is a graph that illustrates an HMG mode group power distribution plot for a launch in accordance with an exemplary embodiment of the invention that uses the HMG optical launch apparatus shown in FIG. 2 with a generally circularly-shaped beam.
Figure 5B:
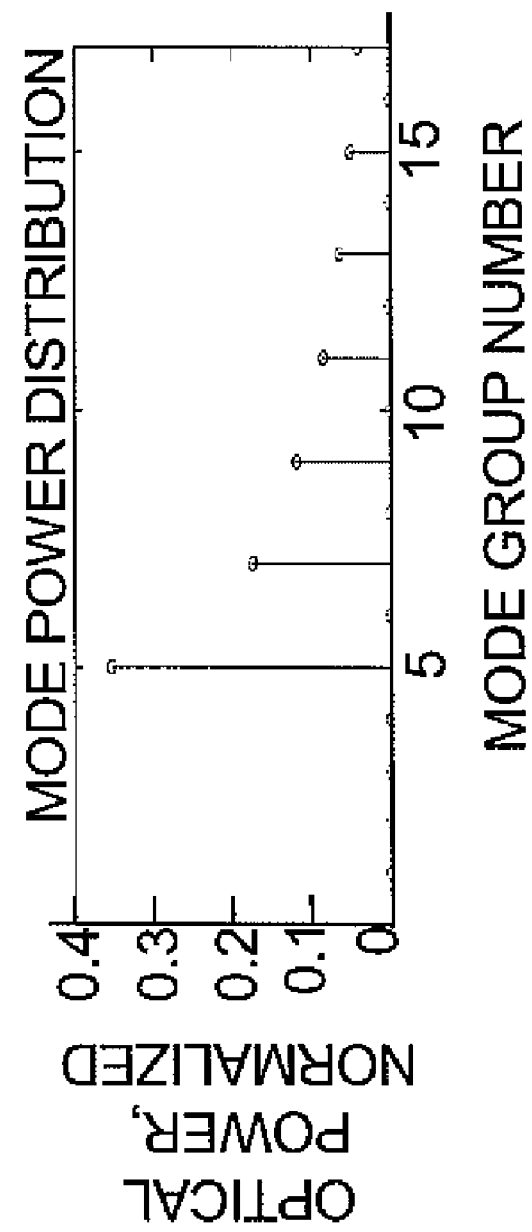
FIG. 5B is a graph that illustrates an LG mode group power distribution plot for a spiral launch that uses a known spiral launch apparatus with a generally circularly-shaped beam.

FIG. 5A is a graph that illustrates an HMG mode group power distribution plot for a launch in accordance with an exemplary embodiment of the invention that uses the HMG optical launch apparatus 10 shown in FIG. 2 with a generally circularly-shaped beam. FIG. 5B is a graph that illustrates an LG mode group power distribution plot for a spiral launch that uses a known spiral launch apparatus (not shown) with a generally circularly-shaped beam. Therefore, with respect to FIG. 5A, the waist 21 of the fundamental mode of the laser 20 is matched to the waist (not shown) of the targeted higher-order HMG mode group in the x-dimension, but not in the y-dimension. For the launch corresponding to FIG. 5A, the higher-order HMG mode group that was targeted was HMG mode group 6, whereas for the launch corresponding to FIG. 5B, the higher-order LG mode group that was targeted was LG mode group 5.

It can be seen in FIG. 5A that HMG mode group 6 was predominantly excited, although some other HMG mode groups were also excited, albeit to a lesser degree than the targeted HMG mode group. Similarly, it can be seen in FIG. 5B that LG mode group 5 was predominantly excited, although some other LG mode groups were also excited, albeit to a lesser degree than the targeted LG mode group. Therefore, both launch techniques were relatively successful at exciting the targeted mode group, although the launch technique of the invention excited the targeted HMG mode group to a greater extent than the spiral launch technique excited the targeted LG mode group. Also, the excited HMG mode groups other than the targeted HMG mode group were excited to a lesser extent than the excited LG mode groups other than the targeted LG mode group. Therefore, the launch technique of the invention was more successful than the spiral launch technique at limiting excitation to the targeted mode group. Furthermore, as will now be described with reference to FIG. 6, when an elliptical beam is used to excite the targeted higher-order HMG mode group, even better results are achieved.

Figure 6:
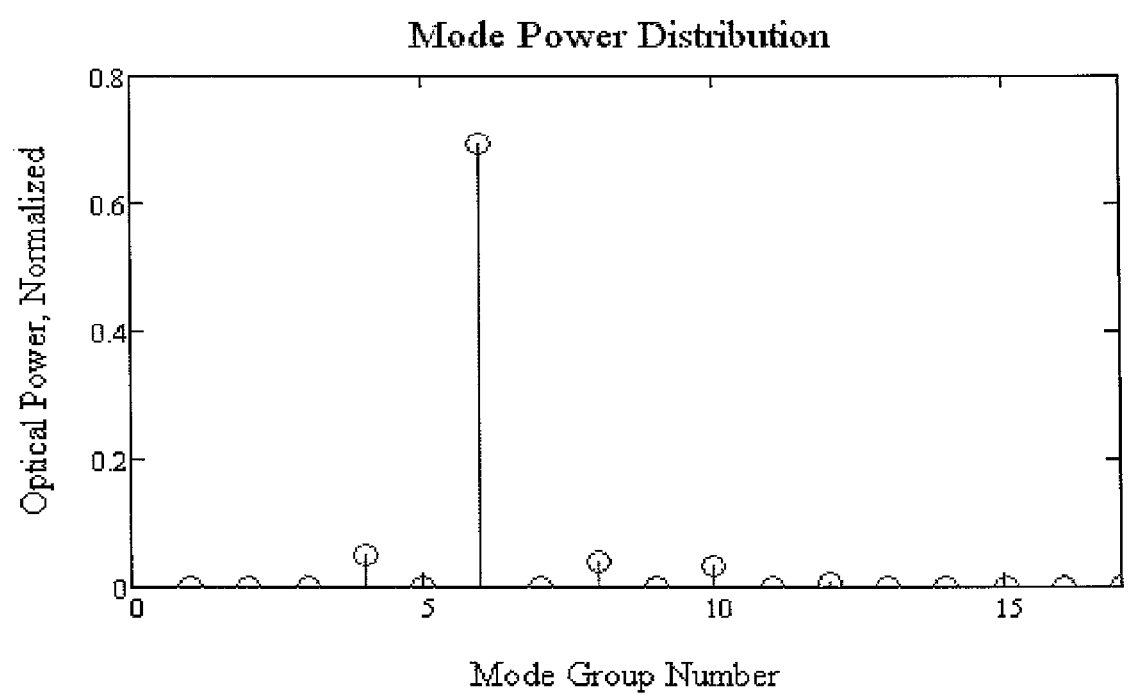
FIG. 6 is a graph that illustrates an HMG mode group power distribution plot for a launch in accordance with an exemplary embodiment of the invention that uses the HMG optical launch apparatus shown in FIG. 2 with an elliptically-shaped beam rather than a circularly-shaped beam.

FIG. 6 is a graph that illustrates an HMG mode group power distribution plot for a launch in accordance with an exemplary embodiment of the invention that uses the HMG optical launch apparatus 10 shown in FIG. 2, but with an elliptically-shaped beam rather than a circularly-shaped beam. For the launch represented by the graph of FIG. 6, the launch conditions and the targeted HMG mode group were the same as those used for the launch represented by FIG. 5A. However, as can be seen in FIG. 6, when an elliptically-shaped beam is used, the targeted HMG mode group, which is HMG mode group 6, is excited to an even greater extent and the non-targeted HMG mode groups are excited to a lesser extent or not at all compared to when a circularly-shaped beam is used. The reason for the improved launch results represented by the graph of FIG. 6 is that, when the elliptically-shaped beam is used, the waist 21 of the fundamental mode of the laser 20 can be matched in both the x- and y-dimensions to the waist of the targeted HMG mode at the entrance facet 50a of the MMF 50. As indicated above, the elliptically-shaped beam can be obtained either by using a laser that produces a generally elliptically-shaped beam (e.g., a DFB laser) or by using a laser that produces a generally circularly-shaped beam (e.g., a VCSEL) in conjunction with one or more optical elements that convert the generally circularly-shaped beam into a generally elliptically-shaped beam.

Figure 7:
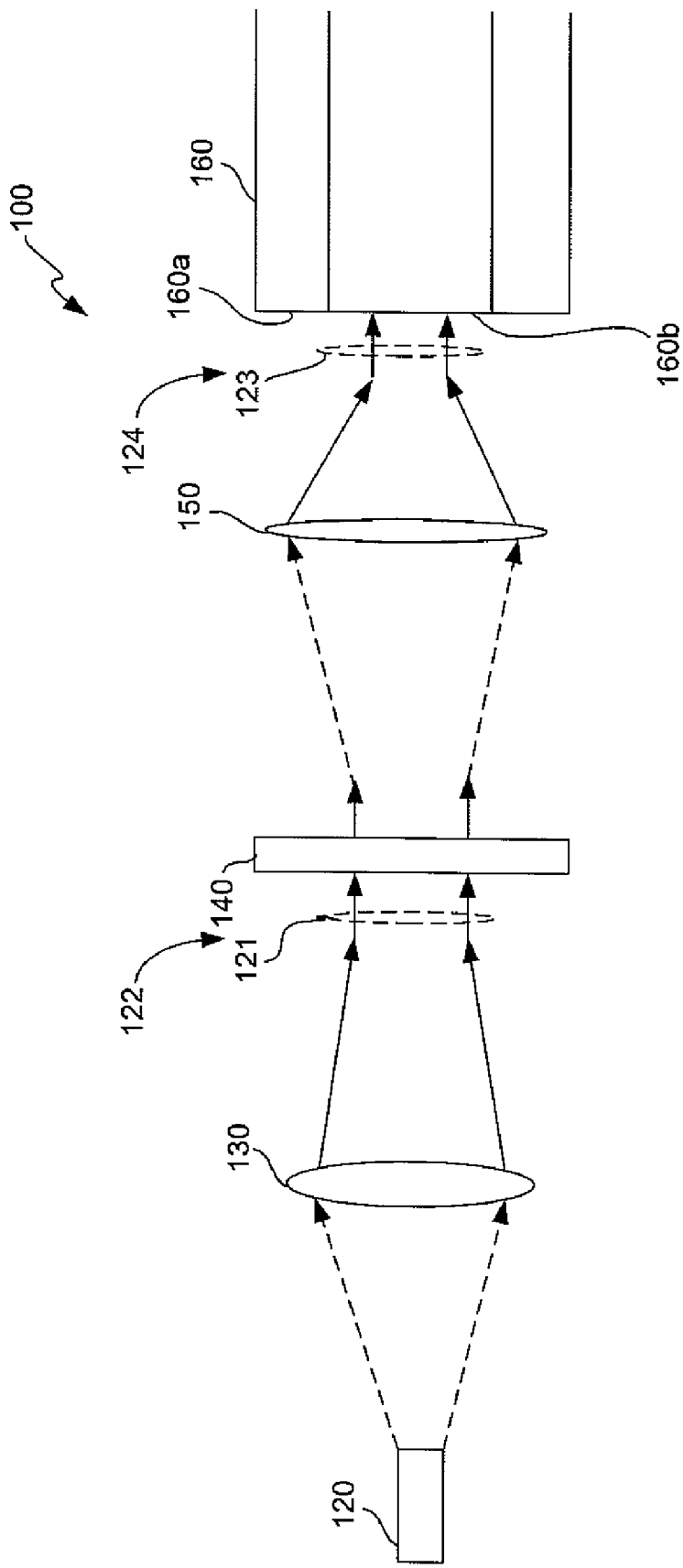
FIG. 7 illustrates a block diagram of the HMG optical launch apparatus 100 in accordance with another illustrative embodiment.

As indicated above, the arrangement shown in FIG. 2 is only one example of many possible arrangements for achieving the HMG launch of the invention. FIG. 7 illustrates another illustrative embodiment of a block diagram of the HMG optical launch apparatus 100. The HMG optical launch apparatus 100 includes a laser 120, a first optical element 130, a linear phase mask 140, and a second optical element 150. In accordance with this embodiment, the first optical element focuses the expanded beam of the laser 120 to a first expanded waist 121 in a first waist region 122. The linear phase mask 140 is positioned in the first waist region 122 so that the first expanded waist 121 is incident on the linear phase mask 140. The phase pattern of the linear phase mask is expanded to match the expanded waist 121. This feature makes manufacturing the linear phase mask 140 an easier task due to the fact that details of the linear phase mask 140 are larger than those of the phase mask 40 shown in FIG. 2 positioned in the smaller waist region 22.

The beam that passes through the linear phase mask 140 is then refocused by the second optical element 150 to a second waist 123 in a second waist region 124. An MMF 160 having an entrance facet 160a is positioned so that the second waist 123 is incident on a core 160b of the MMF 160 at the entrance facet 160a of the MMF 160. As with the embodiment described above with reference to FIG. 2, at the entrance facet 160a of the MMF 160, the waist 123 of the fundamental mode of the laser 120 is matched, or at least substantially matched, to the waist of the targeted higher-order HMG mode group. The linear phase mask 140 operates in the manner described above with reference to FIGS. 3 and 4 to cause the phase of the beam produced by the laser 120 to be matched, or at least substantially matched, to the phase of the targeted higher-order HMG mode group of the MMF 160. As also indicated above, a circularly-shaped or elliptically-shaped beam can be used, but it is preferable to use an elliptically-shaped beam due to the fact that use of an elliptically-shaped beam will allow the waist 123 to be matched to the waist of the higher-order HMG mode group in both the x- and y-dimensions, which provides better excitation of the targeted higher-order HMG mode group and less or no excitation of the non-targeted HMG mode groups. It should be noted, however, that in some cases it may be desirable to cause additional HMG mode groups other than the targeted higher-order HMG mode group to be excited. In these cases, it may be preferable to use a circularly-shaped beam.

Figure 8:
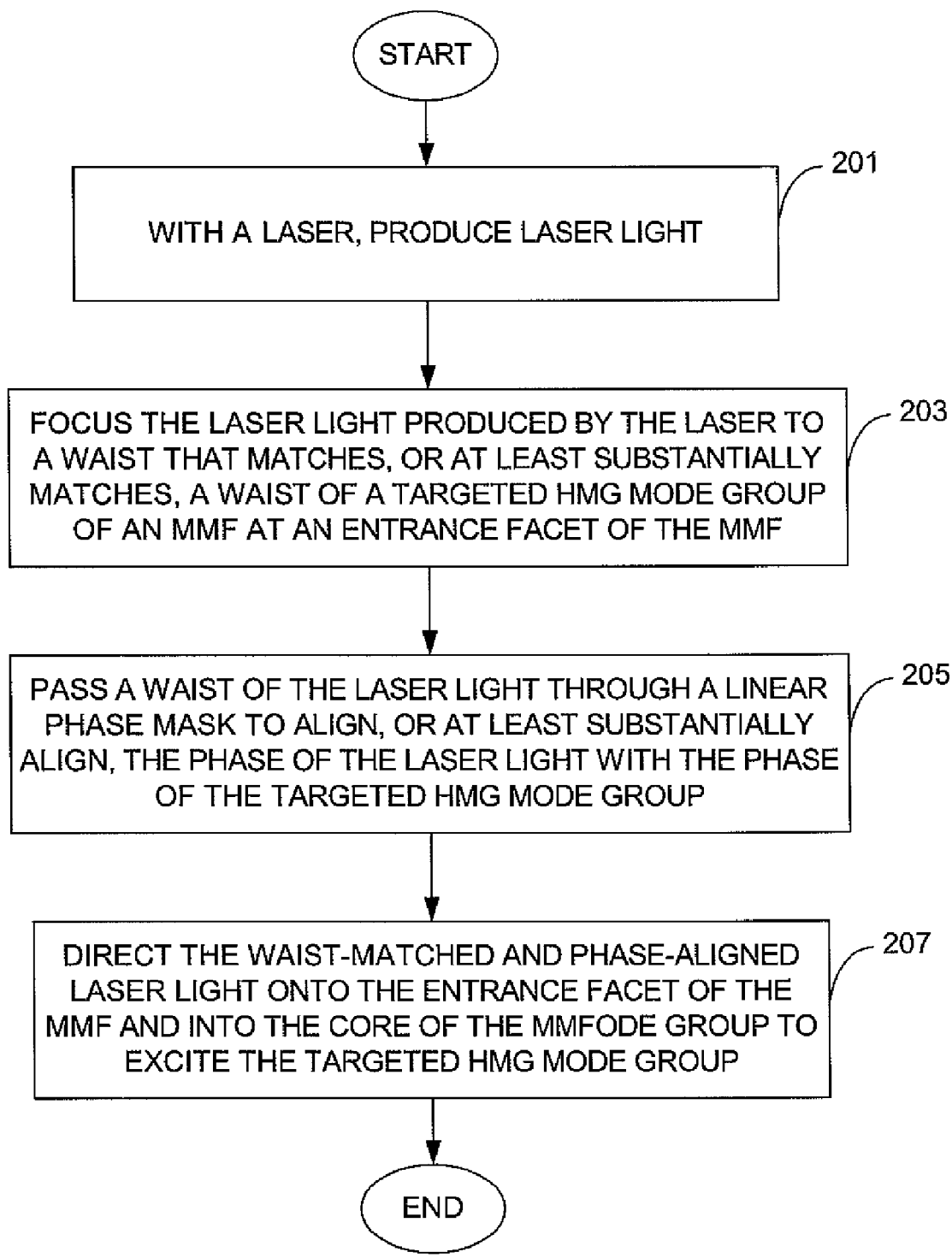
FIG. 8 illustrates a flowchart representing the HMG launch method in accordance with an illustrative embodiment performed by an HMG optical launch apparatus such as that shown in FIGS. 2 and 7.

FIG. 8 illustrates a flowchart representing the HMG launch method in accordance with an illustrative embodiment performed by an HMG optical launch apparatus such as that shown in FIG. 2 or 7. Light is produced by a laser, as indicated by block 201. The light produced by the laser is focused to a waist in a waist region, as indicated by block 203. The waist matches, or at least substantially matches, the waist of a targeted higher-order HMG mode group of an MMF. The light produced by the laser is passed through a linear phase mask that aligns the phase of the light with a phase of the targeted higher-order HMG mode group of the MMF, as indicated by block 205. The phase-aligned light is directed onto the entrance facet of the MMF and into a core of the MMF with a waist of the phase-aligned laser light matched, or at least substantially matched, with the waist of the targeted higher-order HMG mode group of the MMF at the entrance facet of the MMF, as indicated by block 207. As indicated above, the phase-aligned and waist-matched light directed onto the entrance facet of the MMF causes the targeted higher-order HMG mode group to be excited such that the modal bandwidth of the MMF is increased.

With reference to the HMG optical launch apparatuses 10 and 100 shown in FIGS. 2 and 7, optical alignment of the laser 20, 120, the lenses 30, 150 and the MMFs 50, 160 can be performed before insertion and alignment of the linear phase masks 40, 140. If a camera (not shown) is used to monitor the optical outputs of the MMFs 50, 160, the observed spot size from the MMFs 50, 160 will be at its minimum and will match that of the targeted higher-order HMG mode group when correctly aligned. This condition is very apparent and easy to observe. Once this condition is observed, the linear phase mask 50, 160 can be inserted into the arrangements 10, 100 and optically aligned again such that the spot size observed with the camera (not shown) is minimized.

The following are MATHCAD calculations demonstrating the computer algorithms for matching the waist of the fundamental mode of the laser to the targeted higher-order mode of the MMF at the MMF entrance facet and for matching the phase of the fundamental mode of the laser to the phase of a targeted higher-order HMG mode group of the MMF. Because the terms that are used in these equations and the equations themselves are well known, in the interest of brevity, the definitions of each and every one of the terms that are used in the equations will not be provided herein.

Assumptions:
 The initial laser beam is the fundamental HMG mode
 It is assumed that the laser beam has a "y" axis waist that equals the "y" axis waist of the fundamental mode of the MMF to be excited
 In the "x" axis, the laser beam is expanded by a cylindrical lens
 A linear version of the Spiral phase mask is created so that it matches the phase of a particular mode group of the MMF at the MMF entrance facet
 The linear phase mask is placed in the waist of the beam near the MMF entrance facet Part 1: Initialize Constants for Fiber HMG Modes:
 $j: \sqrt{-1}$
 $c: 3 \cdot 10^8$ The speed of light, m/s.
 $\lambda: 1310 \cdot 10^{-9}$ Wavelength of operation, m.

Part 2: Input Initial Data for Fiber Model:

$a: \frac{62.5}{2} \cdot 10^{-6}$     Effective radius of fiber in m.

$n1: 1.5$     Effective peak refractive index of core.

$\Delta v: \frac{n1 - 1.4865}{n1} \cdot 2$     Relative profile index of core.

$\Delta v \cdot 100 = 1.8$     Relative index in percent.

Part 3: Calculate Required Parameters for Fiber Model:

$k0: \frac{2 \cdot \pi}{\lambda}$ $N(g): \frac{g}{g+2} \cdot (n1 \cdot k0 \cdot a)^2 \cdot \Delta v$     This is the approximate number of guided modes for power law fiber model.

$M\max := \text{floor}\left(\sqrt{N(2)}\right) - 1$     The maximum guided mode order.

$\omega 0 := \sqrt{\frac{2 \cdot a}{k0 \cdot n1 \cdot \sqrt{2 \cdot \Delta v}}}$     The waist of the fundamental mode of the fundamental fiber mode in m.

$\omega 0 = 6.767 \times 10^{-6}$     The value for the waist of the fundamental mode of the fiber in m.

$M\max = 20$

Part 4: The Equations for the HMG Fiber Modes Will Now be Developed:
 The Hermite polynomials are defined by:

$$H(p,x) := \sum_{m=0}^{\text{floor}(\frac{p}{2})} \frac{(-1)^m \cdot p! \cdot (2 \cdot x)^{(p-2m)}}{m! \cdot (p-2 \cdot m)!}$$

Let the mode field distribution in the x direction of the fiber be:

$$\psi(x, p, \omega 0) := \left(\frac{2}{\pi}\right)^{\frac{1}{4}} \cdot \left(\frac{1}{\sqrt{2^p \cdot p! \cdot \omega 0}}\right) \cdot H\left(p, \sqrt{2} \cdot \frac{x}{\omega 0}\right) \cdot e^{-\left(\frac{x}{\omega 0}\right)^2}$$

Let the mode field distribution in the y direction of the fiber be:

$$\chi(y, q, \omega 0) := \left(\frac{2}{\pi}\right)^{\frac{1}{4}} \cdot \left(\frac{1}{\sqrt{2^q \cdot q! \cdot \omega 0}}\right) \cdot H\left(q, \sqrt{2} \cdot \frac{y}{\omega 0}\right) \cdot e^{-\left(\frac{y}{\omega 0}\right)^2}$$

Part 5: The Equations for the Linear Phase Induced by the Linear Phase Mask at the MMF Entrance Facet Will be Developed (a Bimodal Phase Mask Will be Used and Mode Group 6 is Targeted):

$$\phi(x): \begin{vmatrix} T(x) \leftarrow \frac{\psi(x, 5, \omega 0)}{|\psi(0.33 \cdot \omega 0, 5, \omega 0)|} & \text{if } |x| \leq 0.677 \cdot \omega 0 \\ T(x) \leftarrow \frac{\psi(x, 5, \omega 0)}{|\psi(1.041 \cdot \omega 0, 5, \omega 0)|} & \text{if } 0.677 \cdot \omega 0 < |x| \leq 1.423 \omega 0 \\ T(x) \leftarrow \frac{\psi(x, 5, \omega 0)}{|\psi(1.943 \omega 0, 5, \omega 0)|} & \text{if } 1.423 \omega 0 < |x| \\ T(x) \leftarrow 1 & \text{if } T(x) > 1 \\ T(x) \leftarrow -1 & \text{if } T(x) < -1 \\ T(x) \end{vmatrix}$$

Part 6: The Fundamental Mode with Different Waists in x and y Directions Will be Multiplied by the Phase Mask to Form the Field Exciting the Fiber:
 x: −25, −24.9 . . . 25
 $Lx(x): \psi(x, 0, \omega 0 \cdot \sqrt{5+1}) \cdot \text{sign}(a \sin(\phi(x)))$ Lx(x) is the resulting excitation at the entrance facet of the MMF. Thus, the excitation is calculated as the product of the expanded laser beam with the waist of the fundamental mode matched to the waist of the targeted higher-order HMG mode group of the MMF and the amplitude factor due to the effect of the binary linear phase mask as a function of x. This product, Lx(x), is what is shown and described above with reference to FIGS. 3 and 4.

It should be noted that the invention has been described with reference to a few illustrative embodiments for the purposes of demonstrating the principles and concepts of the invention, and that the invention is not limited to the illustrative embodiments described herein. For example, the HMG optical launch apparatuses 10 and 100 described above with reference to FIGS. 2 and 7 are merely examples of suitable configurations for performing the HMG launch technique of the invention in order to excite targeted higher-order HMG mode groups of an MMF. Persons skilled in the art will understand, in view of the description being provided herein, the manner in which other optical launch configurations can be used to achieve the goals of the invention. These and other modifications to the embodiments described herein are within the scope of the invention.

What is claimed is:

1. A Hermite Gaussian (HMG) optical launch apparatus for optically launching laser light into a multimode optical fiber (MMF) to excite an identified higher-order mode group of the MMF, the HMG optical launch apparatus comprising:
 a laser for producing laser light;
 at least one optical element positioned to receive laser light produced by the laser, said at least one optical element being configured to focus the received laser light to at least one waist;
 a linear phase mask positioned at a location where the laser light produced by the laser is focused to a waist by said at least one optical element and directed onto the linear phase mask, the linear phase mask being configured with a phase pattern that causes a phase of the laser light directed onto the linear phase mask to be altered to match or substantially match a phase of an identified higher-order HMG mode of the MMF; and wherein the laser, said at least one optical element, and the linear phase mask are positioned relative to each other and relative to an entrance facet of the MMF such that the phase-altered laser light has a waist at the entrance facet of the MMF that matches or substantially matches a waist of said identified higher-order mode of the MMF, and wherein the phase-altered laser light that is incident on the entrance facet of the MMF causes the identified higher-order mode group to which the identified HMG mode belongs to be excited, and wherein the excitation of the identified higher-order mode group causes a modal bandwidth of the MMF to be increased.

2. The HMG optical launch apparatus of claim 1, wherein the phase pattern of the linear phase mask is a binary phase pattern.

3. The HMG optical launch apparatus of claim 1, wherein said at least one optical element focuses the laser light to a first waist, said at least one optical element being positioned in between the laser and the linear phase mask, the linear phase mask being positioned in between said at least one optical element and the entrance facet of the MMF, and wherein the linear phase mask is within the first waist of the laser light such that the first waist of the laser light passes through the linear phase mask and is incident on the entrance facet of the MMF, and wherein the first waist matches or substantially matches the waist of the identified higher-order HMG mode of the MMF at the entrance facet of the MMF.

4. The HMG optical launch apparatus of claim 1, wherein said at least one optical element includes at least first and second optical elements, the first optical element being positioned in between the laser and the linear phase mask, the second optical element being positioned in between the linear phase mask and the entrance facet of the MMF, the first optical element receiving a first expanded beam of the laser light produced by the laser and focusing the first expanded beam to a first waist that is incident on the linear phase mask, the first waist passing through the linear phase mask and expanding to a second expanded beam that is incident on the second optical element, the second expanded beam having said phase that is altered by the linear phase mask to match or substantially match the phase of the identified higher-order HMG mode of the MMF, the second optical element focusing the phase-altered second expanded beam to a second waist that is incident on the entrance facet of the MMF, wherein the second waist matches or substantially matches the waist of the identified higher-order HMG mode of the MMF at the entrance facet of the MMF.

5. The HMG optical launch apparatus of claim 1, wherein the laser light produced by the laser is a generally circularly-shaped beam of laser light.

6. The HMG optical launch apparatus of claim 5, wherein said at least one optical element includes one or more optical elements for converting the generally circularly-shaped beam of laser light into a generally elliptically-shaped beam of laser light such that the waist of laser light that is directed by said at least one optical element onto the linear phase mask is a generally elliptically-shaped waist, and wherein the waist of the phase-altered laser light that is incident on the entrance facet of the MMF is a generally elliptically-shaped waist that matches or substantially matches the waist of the identified higher-order HMG mode in an x-dimension and in a y-dimension of a Cartesian Coordinate System.

7. The HMG optical launch apparatus of claim 1, wherein the laser light produced by the laser is a generally elliptically-shaped beam of laser light.

8. The HMG optical launch apparatus of claim 7, wherein said at least one optical element focuses the generally elliptically-shaped beam of laser light onto the linear phase mask, and wherein the waist of the phase-altered laser light that is incident on the entrance facet of the MMF is a generally elliptically-shaped waist that matches or substantially matches the waist of the identified higher-order HMG mode in an x-dimension and in a y-dimension of a Cartesian Coordinate System.

9. A method for performing a Hermite Gaussian (HMG) optical launch of laser light into a multimode optical fiber (MMF) to excite an identified higher-order mode group of the MMF, the method comprising:

with a laser, producing laser light;

with at least one optical element, receiving laser light produced by the laser and focusing the received laser light to at least one waist;

passing laser light produced by the laser through a linear phase mask positioned at a location where the laser light is focused to a waist by said at least one optical element to cause a phase of the laser light passed through the linear phase mask to be altered to match or substantially match a phase of an identified higher-order HMG mode of the MMF; and directing the phase-altered laser light onto an entrance facet of the MMF to cause the identified higher-order HMG mode of the MMF to be excited, wherein the laser, said at least one optical element, and the linear phase mask are positioned relative to each other and relative to the entrance facet of the MMF such that the phase-altered laser light has a waist at the entrance facet of the MMF that matches or substantially matches a waist of said identified higher-order mode group to which the identified HMG mode belongs, and wherein the excitation of the identified higher-order mode group causes a modal bandwidth of the MMF to be increased.

10. The method of claim 9, wherein the phase pattern of the linear phase mask is a binary phase pattern.

11. The method of claim 9, wherein said at least one optical element focuses the laser light to a first waist, said at least one optical element being positioned in between the laser and the linear phase mask, the linear phase mask being positioned in between said at least one optical element and the entrance facet of the MMF, and wherein the linear phase mask is within the first waist of the laser light such that the first waist of the laser light passes through the linear phase mask and is incident on the entrance facet of the MMF, and wherein the first waist matches or substantially matches the waist of the identified higher-order mode group of the MMF at the entrance facet of the MMF.

12. The method of claim 9, wherein said at least one optical element includes at least first and second optical elements, the first optical element being positioned in between the laser and the linear phase mask, the second optical element being positioned in between the linear phase mask and the entrance facet of the MMF, the first optical element receiving a first expanded beam of the laser light produced by the laser and focusing the first expanded beam to a first waist that is incident on the linear phase mask, the first waist passing through the linear phase mask and expanding to a second expanded beam that is incident on the second optical element, the second expanded beam having said phase that is altered by the linear phase mask to match or substantially match the phase of the identified higher-order HMG mode of the MMF, the second optical element focusing the phase-altered second expanded beam to a second waist that is incident on the entrance facet of the MMF, wherein the second waist matches or substantially matches the waist of the identified higher-order mode group to which the identified HMG mode belongs at the entrance facet of the MMF.

13. The method of claim 9, wherein the laser light produced by the laser is a generally circularly-shaped beam of laser light.

14. The method of claim 13, wherein said at least one optical element includes one or more optical elements for converting the generally circularly-shaped beam of laser light into a generally elliptically-shaped beam of laser light such that the waist of laser light that is directed by said at least one optical element onto the linear phase mask is a generally elliptically-shaped waist, and wherein the waist of the phase-altered laser light that is incident on the entrance facet of the MMF is a generally elliptically-shaped waist that matches or substantially matches the waist of the identified higher-order HMG mode of the MMF in an x-dimension and in a y-dimension of a Cartesian Coordinate System.

15. The method of claim 9, wherein the laser light produced by the laser is a generally elliptically-shaped beam of laser light.

16. The method of claim 15, wherein said at least one optical element focuses the generally elliptically-shaped beam of laser light onto the linear phase mask, and wherein the waist of the phase-altered laser light that is incident on the entrance facet of the MMF is a generally elliptically-shaped waist that matches or substantially matches the waist of the identified higher-order HMG mode in an x-dimension and in a y-dimension of a Cartesian Coordinate System.

* * * * *